US008128835B2

(12) United States Patent
Stokes et al.

(10) Patent No.: US 8,128,835 B2
(45) Date of Patent: Mar. 6, 2012

(54) DEICING COMPOSITION

(75) Inventors: David B. Stokes, Shelby, NC (US); Daniel Person Johnston, Pierre, SD (US); Prasada Rao Rangaraju, Clemson, SC (US); Vijay C. Mehta, Gastonia, NC (US); Claudio E. Manissero, Huntersville, NC (US)

(73) Assignees: FMC Corporation, Lithium Division, Philadelphia, PA (US); Clemson University, Anderson, SC (US)

( * ) Notice: Subject to any disclaimer, the term of this patent is extended or adjusted under 35 U.S.C. 154(b) by 0 days.

(21) Appl. No.: 13/082,563

(22) Filed: Apr. 8, 2011

(65) Prior Publication Data

US 2011/0185943 A1 Aug. 4, 2011

Related U.S. Application Data

(63) Continuation of application No. 12/625,672, filed on Nov. 25, 2009, now Pat. No. 7,943,057, which is a continuation of application No. 11/533,568, filed on Sep. 20, 2006, now abandoned.

(60) Provisional application No. 60/719,624, filed on Sep. 22, 2005.

(51) Int. Cl.
*C09K 3/18* (2006.01)
*C04B 24/04* (2006.01)
*C04B 22/08* (2006.01)
*C04B 103/60* (2006.01)

(52) U.S. Cl. ............ 252/70; 106/13; 106/728; 106/810; 106/819; 106/823

(58) Field of Classification Search .................... 252/70; 106/13, 802, 819, 823, 728, 810
See application file for complete search history.

(56) References Cited

U.S. PATENT DOCUMENTS

| | | | |
|---|---|---|---|
| 4,685,967 A | 8/1987 | Enjo et al. | |
| 4,855,071 A | 8/1989 | Todd, Jr. et al. | |
| 5,350,533 A | 9/1994 | Hubred et al. | |
| 5,387,358 A | 2/1995 | Himmrich et al. | |
| 5,387,359 A | 2/1995 | Himmrich et al. | |
| 5,435,930 A | 7/1995 | Chan et al. | |
| 5,705,087 A | 1/1998 | Mushbrush et al. | |
| 5,755,876 A * | 5/1998 | Stokes et al. ................ | 106/739 |
| 5,985,011 A | 11/1999 | Foltz et al. | |
| 6,022,408 A * | 2/2000 | Stokes et al. ................ | 106/739 |
| 6,080,330 A | 6/2000 | Bloomer | |
| 6,156,226 A | 12/2000 | Klyosov et al. | |
| 6,228,283 B1 | 5/2001 | Turcotte et al. | |
| 6,299,793 B1 | 10/2001 | Hartley et al. | |
| 6,399,021 B1 | 6/2002 | Heimann et al. | |
| 6,440,325 B1 | 8/2002 | Hartley et al. | |
| 6,500,254 B1 | 12/2002 | Baxter et al. | |
| 6,582,622 B1 | 6/2003 | Hartley et al. | |
| 6,596,188 B1 | 7/2003 | Hartley et al. | |
| 6,596,189 B1 | 7/2003 | Moles et al. | |
| 6,599,440 B2 | 7/2003 | Hartley et al. | |
| 6,673,261 B1 | 1/2004 | Gurkaynak et al. | |
| 6,676,847 B2 | 1/2004 | Turcotte et al. | |
| 6,770,217 B2 | 8/2004 | Hartley et al. | |
| 6,827,873 B2 | 12/2004 | Hartley et al. | |
| 6,872,327 B2 | 3/2005 | Dietl | |
| 7,943,057 B2 * | 5/2011 | Stokes et al. ................ | 252/70 |
| 2003/0146409 A1 | 8/2003 | Vickers, Jr. et al. | |
| 2004/0164270 A1 | 8/2004 | Novak | |
| 2004/0173783 A1 | 9/2004 | Curzon et al. | |
| 2005/0284340 A1 | 12/2005 | Vickers, Jr. et al. | |

FOREIGN PATENT DOCUMENTS

| | | |
|---|---|---|
| EP | 1333081 A2 | 8/2003 |
| JP | 59-025868 A | 2/1984 |
| JP | 59025868 | 2/1984 |
| JP | 2001-187881 A1 | 7/2001 |
| WO | WO 94/17152 A1 | 8/1994 |

OTHER PUBLICATIONS

Database WPI, Week 200205, Derwent Publications Ltd., London, GB; AN 2002-036643, XP002414063 & JP 2001 187881 A (Korea Highway Corp.), Jul. 10, 2001.
International Search Report and the Written Opinion of the International Searching Authority, or the Declaration, corresponding to International Application No. PCT/US2006/036886; mailed Jan. 31, 2007.
Examination Report corresponding to European Application No. 06825059.6 dated Mar. 31, 2010.
Chinese Office Action corresponding to Chinese Application No. 200680034247.9 dated Jul. 2, 2010.
Extended European Search Report corresponding to European Application No. 10183610.4 dated Nov. 18, 2010.
Examination Report corresponding to European Application No. 10183610.4 dated Sep. 16, 2011.

* cited by examiner

*Primary Examiner* — Anthony J Green
(74) *Attorney, Agent, or Firm* — Myers Bigel Sibley & Sajovec, PA

(57) ABSTRACT

A deicing composition is provided. The composition includes a potassium or sodium salt of a carboxylic acid and a lithium salt of a carboxylic acid or lithium nitrate, wherein the molar ratio of lithium to potassium or lithium to sodium is from 10 percent to 80 percent.

5 Claims, 7 Drawing Sheets

DEICING COMPOSITION

CROSS-REFERENCE TO RELATED APPLICATION

This application is a continuation application of U.S. application Ser. No. 12/625,672 filed on Nov. 25, 2009, issued as U.S. Pat. No. 7,943,057 on May 17, 2011, which is a continuation of U.S. application Ser. No. 11/533,568 filed on Sep. 20, 2006, now abandoned, which claims priority to U.S. Provisional Application Ser. No. 60/719,624, filed Sep. 22, 2005, the disclosures of which are incorporated herein by reference in their entireties.

FIELD OF THE INVENTION

The present invention relates to deicing compositions suitable for use on any outdoor exposed concrete surfaces such as airport runways, taxiways and aprons, highways, sidewalks, parking lots, etc.

BACKGROUND OF THE INVENTION

Snow and ice on concrete pavements such as airport runways, roads, sidewalks, bridges and the like can lead to significant traffic and safety issues. Thus, various compositions have been proposed to deice such concrete pavements. Historically, alkali and alkaline earth chlorides like sodium chloride, potassium chloride and calcium chloride have been used. These compounds while effective and relatively inexpensive are; however, very corrosive with respect to metals like iron, copper, aluminum, and the like. In addition, such chlorides can be harmful to the environment. Thus, while these materials may be acceptable in some applications, chloride-bearing deicers are not suitable for concrete surfaces, particularly those used by aircraft. Glycol-based formulations, urea-containing formulations and methanol-containing formulations have also been suggested. These formulations, however, can be toxic, corrosive, and some are highly flammable.

To overcome these problems, it has been suggested to use sodium or potassium acetate or formate solutions. See, for example, U.S. Pat. No. 5,064,551 to Smith et al. and U.S. Pat. No. 5,350,533 to Hubred et al. Such acetates and formates tend to be more environmentally friendly and less corrosive to metal objects. These compositions; however, tend to cause cracking and deterioration on the surface of the concrete structure and within the concrete matrix.

A major cause of this concrete deterioration is due to the alkali-silica reaction (ASR). Stark, D., Morgan, B., Okamoto, P. and Diamond, S. "Eliminating or Minimizing Alkali-Silica Reactivity." SHRP-C-343, Strategic Highway Research Program, National Research Council, Washington, D.C., 1993, 226 p. ASR, in addition to cracking, can cause deleterious expansion and surface spalling. ASR is a condition that exists in concrete because of four main factors: reactive silica, which is supplied by the aggregates in the concrete; a high pH in the pore solution, high enough to begin to dissolve whatever species of reactive silica is present (different thresholds for different species); significant sodium and potassium ions to combine with the dissolved silica and form reactive gels (ASR reaction product); and, sufficient moisture to first enable the reactions to proceed at all (i.e., providing a medium for ion transport), and secondly, to supply moisture to the gels which will absorb it and expand.

ASR can weaken the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to deicers, thus allowing corrosion of the steel it was designed to protect. ASR can also cause the failure of concrete structures. Prior attempts to control ASR include, for example, using cement with very low alkali content, non-reactive aggregate, and pozzolanic materials such as fly ash, silica fume, ground blast granulated furnace slag, zeolite minerals, thermally activated clay, and the like.

Lithium-based compounds have been shown to be effective in ASR inhibition by introducing these chemicals into concrete or mortar mix compositions. W. J. McCoy and A. G. Caldwell, "New Approach to Inhibiting Alkali-Aggregate Expansion," J. Amer. Concrete Institute, 22:693-706 (1951). However, this requires introducing the lithium-based compounds in the concrete or mortar mixture and does not address the problem of controlling or remediating ASR in existing hardened structures or the deicing issues.

Thus, a need has been identified for a composition that is an effective deicer and that significantly reduces deleterious ASR effects of sodium and potassium chloride or acetate compositions.

SUMMARY OF THE INVENTION

In an embodiment of the invention, a deicing composition comprising a potassium or sodium salt of a carboxylic acid and a lithium salt of a carboxylic acid or nitrate is provided. In one embodiment, the molar ratio of lithium to potassium or lithium to sodium is from 10 percent to 80 percent. Suitable carboxylic acids include formic, acetic, propionic, glycolic and lactic acid.

In another embodiment, in applications where corrosion concerns do not restrict their use, the incorporation of significant ratios of lithium compounds along with metal (e.g., sodium, potassium, calcium, and/or magnesium) halide salts can moderate ASR-aggravating effects that would otherwise ensue with the use of non-lithium-bearing compositions. The molar ratio of lithium to the metal of the salt is from 10 to 80 percent.

Additional embodiments of the present invention provide methods of applying the compositions of the above embodiments.

BRIEF DESCRIPTION OF THE DRAWINGS

The above objects and advantages of the present invention will become more apparent by describing in detail embodiments of the present invention with reference to the attached drawings in which.

DETAILED DESCRIPTION OF EMBODIMENTS ACCORDING TO THE INVENTION

Figure 1:
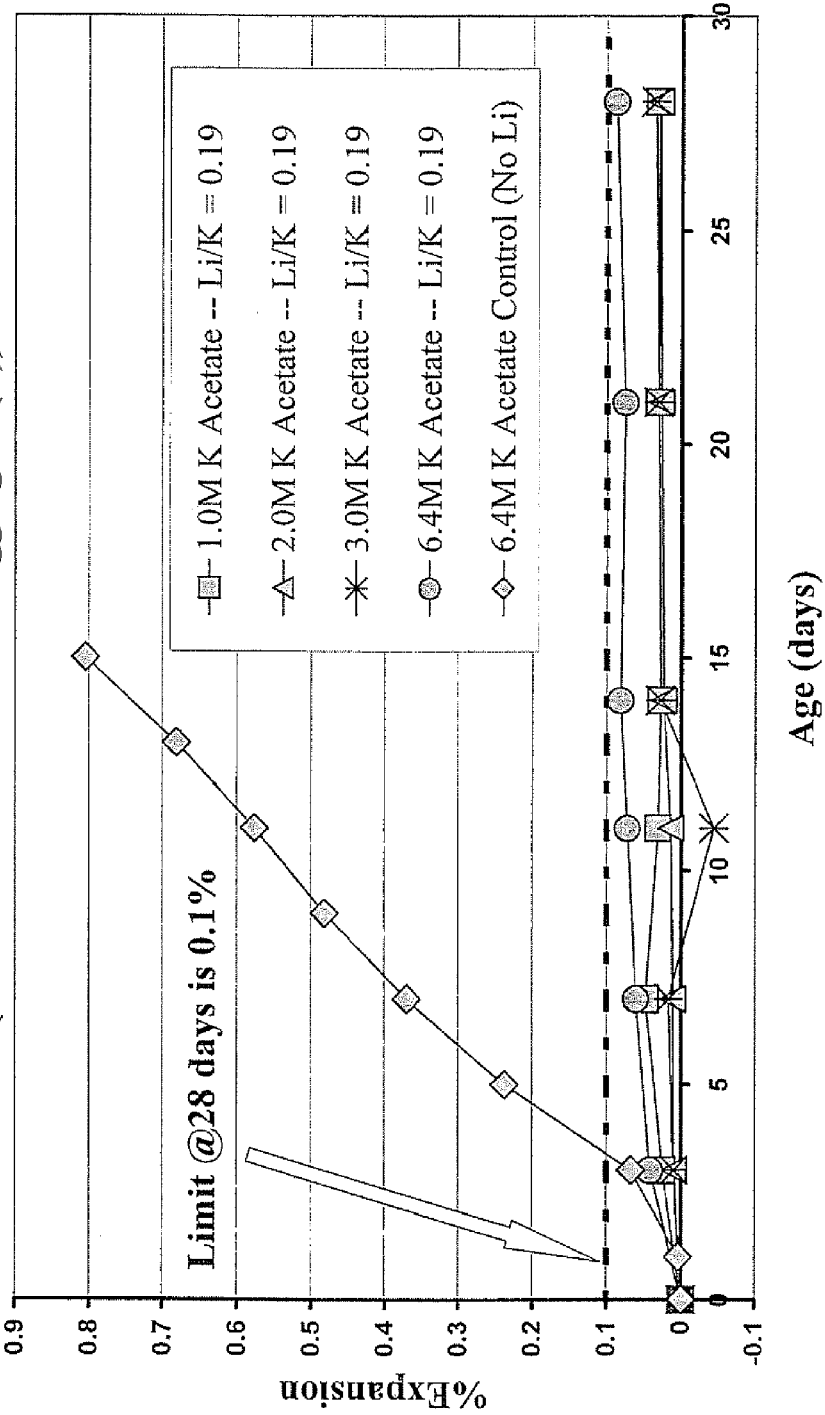
FIGS. 1-4 are graphs of expansion in percent versus age in days for a deicing composition having a Li/K ratio of 0.19 and for various concentrations of potassium acetate and concrete aggregates.
Figure 2:
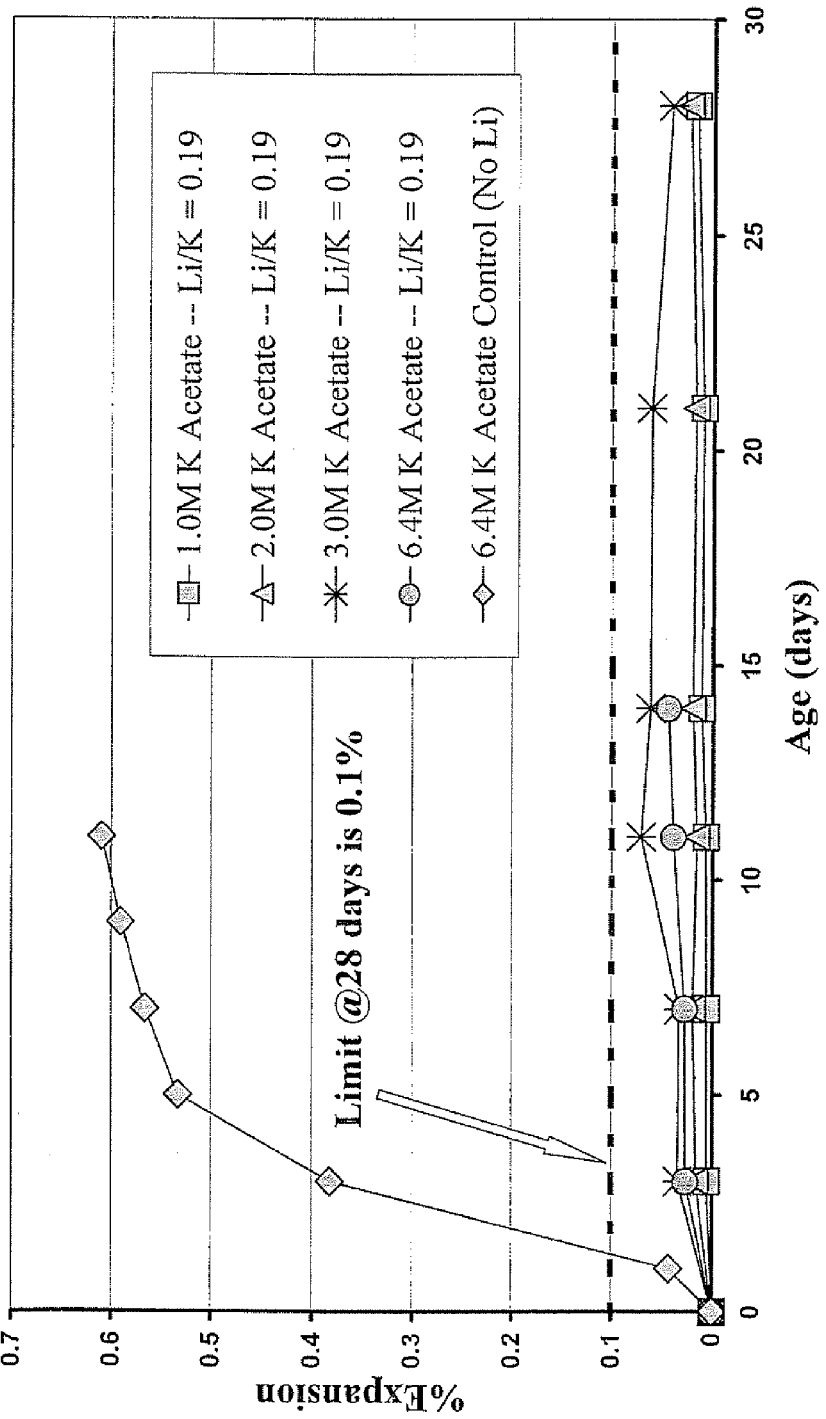
Figure 3:
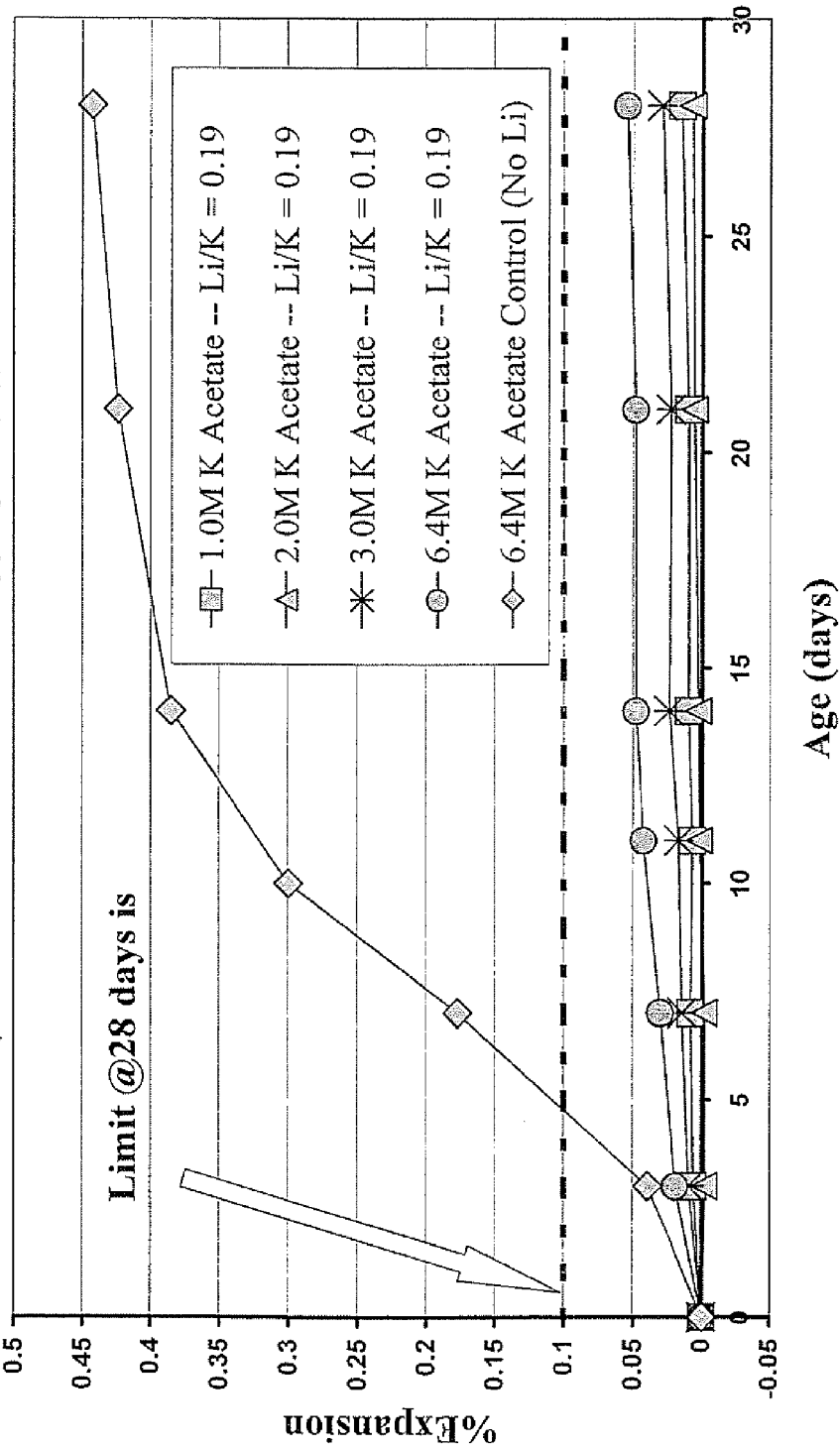
Figure 4:
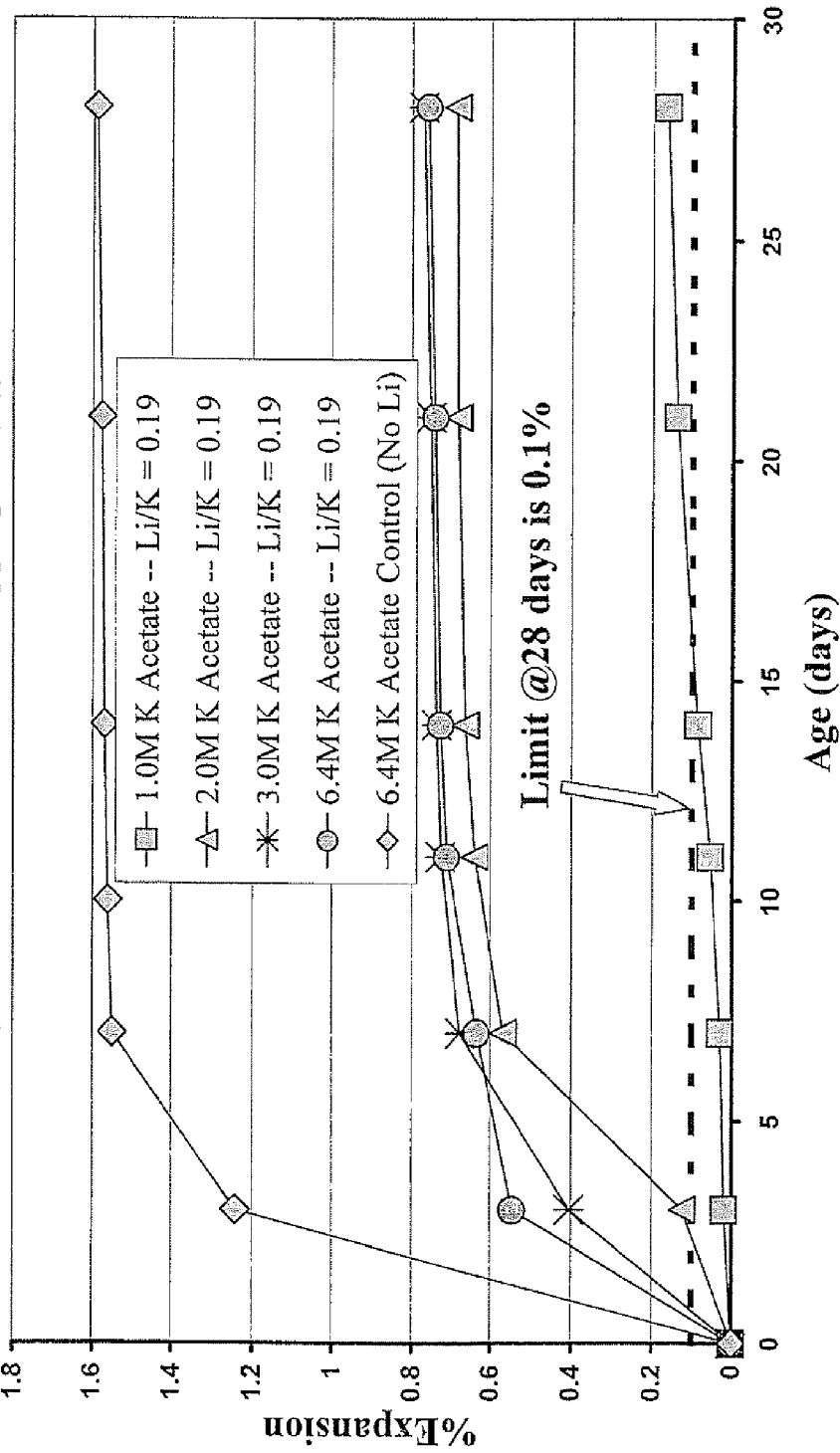

The present invention will now be described more fully herein with reference to the accompanying drawings, in which embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all terms, including technical and scientific terms used in the description of the invention, have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Moreover, it will be understood that steps comprising the methods provided herein can be performed independently or at least two steps can be combined. Additionally, steps comprising the methods provided herein, when performed independently or combined, can be performed at the same temperature or at different temperatures without departing from the teachings of the present invention.

The deicing composition of the present invention comprises a potassium or sodium salt of a carboxylic acid and a lithium salt of a carboxylic acid or an alkali metal nitrate. Suitable carboxylic acids include formic, acetic, propionic, glycolic, and lactic acid, or mixtures thereof Suitable alkali metal nitrates include lithium nitrate.

Control of the amount of potassium or sodium ions to lithium ions is one attribute of the present invention. This amount is often expressed in terms of molar ratio. The amount of lithium necessary for preventing deleterious expansions from ASR is related to the alkali loading of the concrete, and is usually calculated based on the alkali loading of the concrete supplied by the Portland cement component of the concrete. In one embodiment, the molar ratio of lithium to potassium is from 10 percent to 80 percent.

The amount of the potassium or sodium salt of a carboxylic acid may be 0.1 to 95 percent by weight, and often is 27 to 86 percent by weight. The amount of the lithium salt of a carboxylic acid may be 0.1 to 95 percent by weight, and often is 14 to 76 percent by weight.

In deicing situations wherein corrosion is not as big of a concern, the deicing composition can comprise a metal chloride and a lithium salt of a carboxylic acid or a lithium nitrate. Exemplary metals include potassium, sodium, magnesium, and calcium. Again, the lithium to metal ratio is from 10 percent to 80 percent.

An example of a deicing solution would be an aqueous solution that was 4.5 molar in potassium acetate and 1.7 molar in lithium nitrate. Another example of a deicing solution would be an aqueous solution that was 3.7 molar in potassium acetate and 2.8 molar in lithium acetate, in formulations with or without corrosion inhibitors. Another example would be an aqueous solution that was 4.5 molar in potassium acetate and 2.0 molar in lithium acetate, in formulations with or without corrosion inhibitors. Another would be an aqueous solution that was 4.0 molar in potassium acetate, 1.0 molar in calcium acetate, and 1.5 molar in lithium acetate, in formulations with or without corrosion inhibitors. Another example of a solid (powder, granulated, or pelletized) formulation would be a blend of 2 parts sodium acetate trihydrate and 1 part lithium acetate dihydrate, with or without added corrosion inhibitors. Another example of a solid formulation would be a blend of 4 parts sodium acetate trihydrate and 1 part lithium acetate dihydrate, with or without added corrosion inhibitors. Another example of a solid formulation would be a blend of 4 parts calcium magnesium acetate (CMA) and 1 part lithium acetate dihydrate, with or without added corrosion inhibitors. Another example of a solid formulation would be a blend of 3 parts sodium formate and 2 parts lithium formate monohydrate, with or without added corrosion inhibitors. Another example of a solid formulation would be a blend of 3 parts sodium formate and 1 part lithium formate monohydrate, with or without added corrosion inhibitors. Another example of a solid formulation would be a blend of 3 parts sodium chloride and 1 part lithium chloride, with or without added corrosion inhibitors.

Additionally in one embodiment involving aqueous solutions based on acetate salts, the percent solids amount is controlled. In one embodiment, the weight percent solids of the deicing composition is 40 percent to 55 percent. In another embodiment, the weight percent solids is 45 to 49 percent. The weight percent solids is controlled in order to maintain a sufficiently low freezing point for liquid deicers. Stated otherwise, the amount is controlled to avoid adversely affecting the eutectic point of the salt. Under this disclosure for use on airfields under current typical specifications (SAE AMS 1435A) for airfields, the minimum solids content would be 46% or higher for combinations of lithium and potassium actetate in solution.

The deicing composition may include corrosion inhibitors. Suitable corrosion inhibitors may include zinc, antimony, phosphates, phosphonic acid derivatives such as 1-hydroxyethylidene diphosphonic acid (HEDP), nitrates, manganese, cadmium, nickel, cobalt, tin, aluminum, alkyl molybdates, amines, carbohydrates, gluconates, citrates, silicates, and triazoles, such as tolyltriazole salts, and mixtures thereof The amount of corrosion inhibitor is from 0.0 to 5 percent by weight.

The compositions of the invention also advantageously include one or more surface active agents. As used herein, the term "surface active agent" refers generally to agents capable of reducing the surface tension of liquids. Such agents are also known generally in the art also as surfactants. Various surface active agents can be used in the compositions of the invention, including cationic, anionic, nonionic, and amphoteric surfactants, and mixtures thereof Exemplary surfactants include fluorocarbon anionic, cationic and nonionic surfactants, such as, but not limited to, amine perfluoroalkyl sulfonates, potassium fluorinated alkyl carboxylates, fluorinated alkyl quaternary ammonium iodides, fluorinated alkyl esters, and the like useful as surface active agents. Useful surfactants include fluorocarbon anionic, cationic and nonionic surfactants commercially available from 3M as the Fluorad® series of surfactants and the Dowfax® surfactants available from Dow Chemical.

The deicing composition is applied to the concrete surface using conventional techniques. An exemplary technique is spraying. The method used to apply the composition to the concrete surfaces is not believed critical, so long as the deicing composition contacts the surface of the structure for time sufficient to allow deicing to occur.

The concrete surfaces to be treated include airfield runways, aprons, taxiways; roadways, sidewalks, bridges, etc, namely virtually all outdoor-exposed concrete surfaces that receive vehicular or pedestrian traffic. Exemplary concrete compositions are cement, aggregates, water, and conventional additives such as air-entraining, water reducing, accelerating and retarding admixtures, corrosion inhibitors, and the like. As used herein, the term "cement" refers to, but is not limited to, hydraulic and alite cements, such as Portland cement; blended cements, such as Portland cement blended with fly ash, blast-furnace slag, pozzolans, and the like, and mixtures thereof masonry cement; oil well cement; natural cement; alumina cement; expansive cements, and the like, and mixtures thereof Portland cements include cements such as described in ASTM C150 Type I and IA, Type II and IIA, Type III and IIIA, Type IV, and Type V. The term also includes cements blended with ASTM C311 defined pozzolanic materials such as fly ash, raw and calcined natural pozzolans, ASTM C989 defined ground granulated blast furnace slag, ASTM C1240 defined silica fume materials, metakaolin, and the like. Suitable aggregates include limestone, rhyolite, argillite, and quartzite.

The present invention will be further illustrated by the following non-limiting examples.

EXAMPLES

Figure 5:
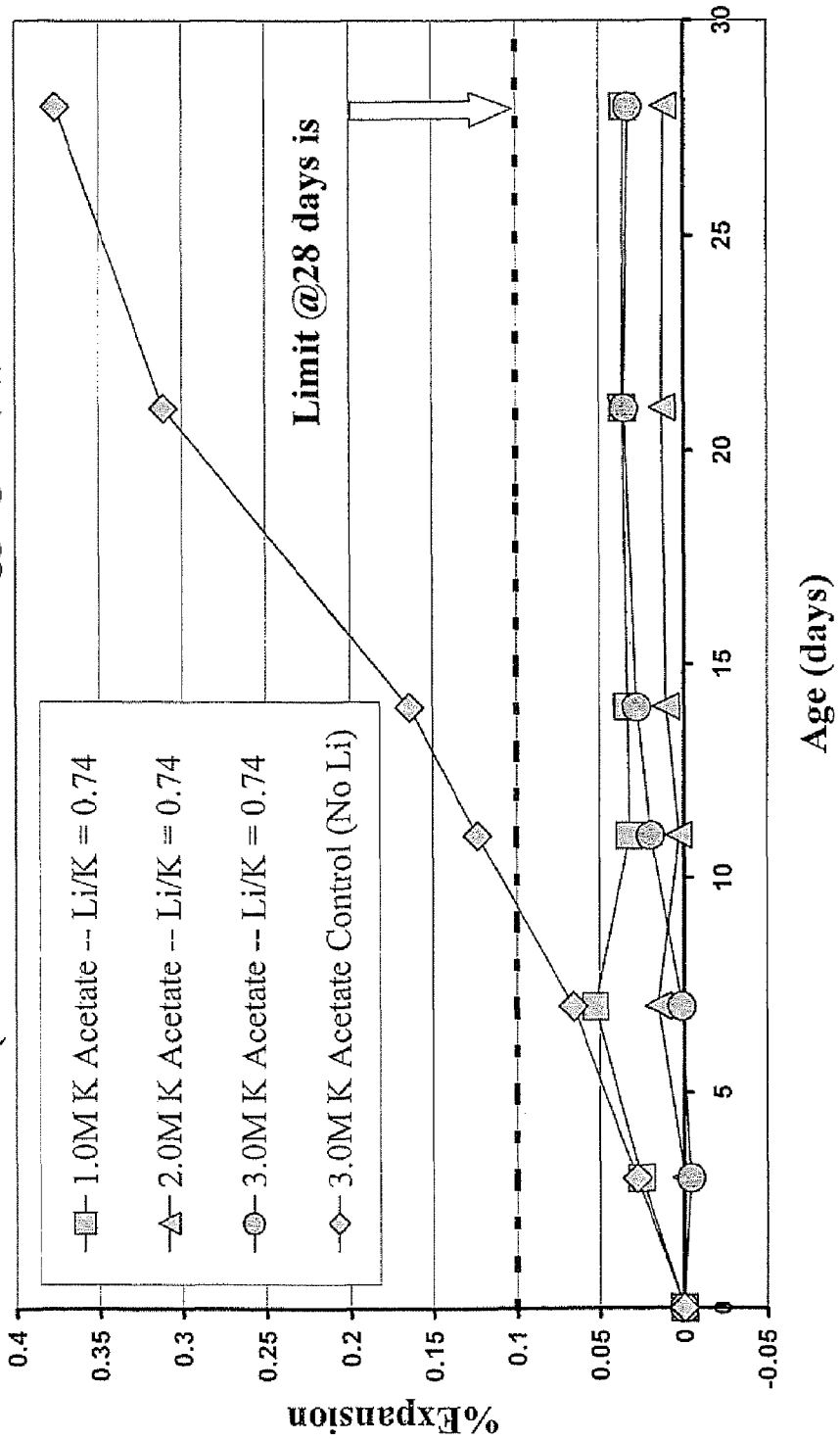
FIGS. 5-7 are graphs of expansion in percent versus age in days for a deicing composition having a Li/K ratio of 0.74 and for various concentrations of potassium acetate and various concrete aggregates.
Figure 6:
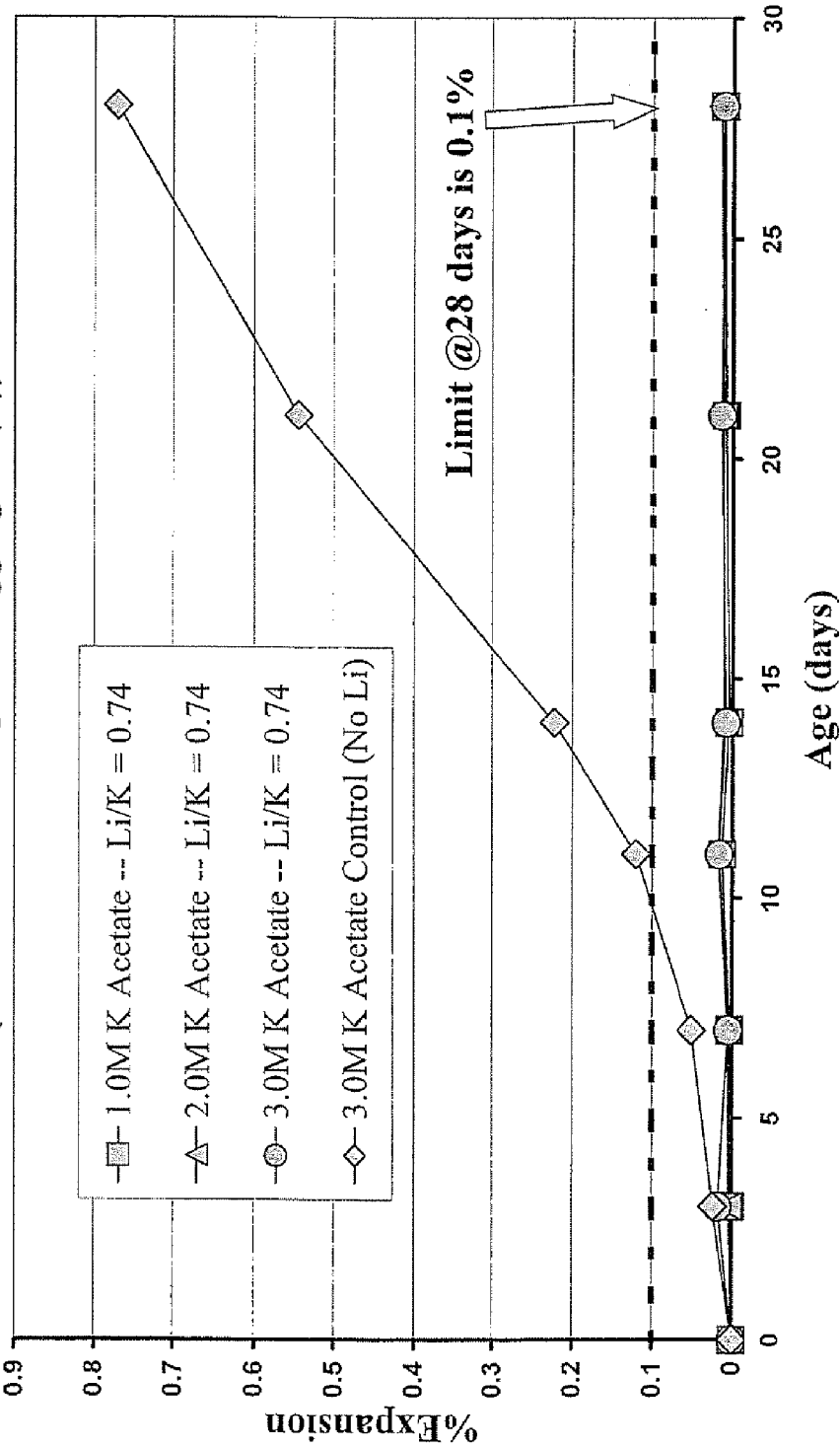
Figure 7:
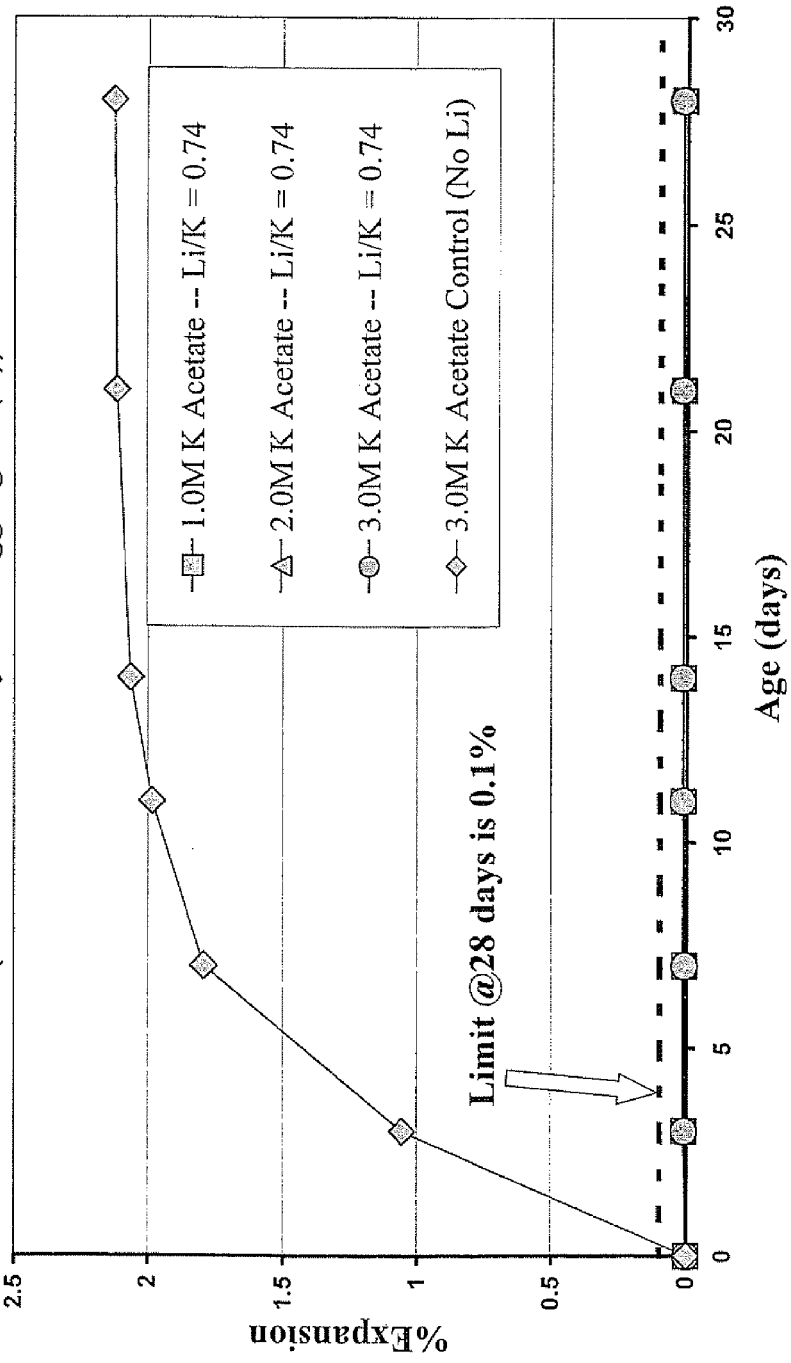

To demonstrate the effectiveness of the lithium portion of the deicer composition, the following experiments were conducted Mortars incorporating four different aggregates were cast into ASTM C 1260-type bars using ASTM C150 Type 1, high alkali (0.82% $Na_2O_{eq}$) cement. The aggregate types were a limestone ("L"), a rhyollite ("R"), an argillite ("A"), and a quartzite ("Q"), and all have demonstrated deleterious ASR reactions in actual concrete structures in the field. Controls of 50 percent (6.4M) potassium acetate were used, and the mortar bars were stored in these solutions, and duplicates in the solutions described below, at 80° C. FIGS. 1-4 show the percent expansion versus age data for the mortar bars stored in the various concentrates (1M, 2M, 3M, 6.4M) of potassium acetate and with solutions incorporating lithium nitrate at a molar ratio of Li/K of 0.19. FIGS. 5-7 show the percent expansion versus age data for the mortar bars stored in the various concentrates (1M, 2M, 3M) of potassium acetate and with solutions incorporating lithium nitrate at a molar ratio of Li/K of 0.74. Percent expansion in these conditions above 0.1 percent at 14 or 28 days is indicative of deleterious ASR in the mortars. For most aggregates shown here, the lower 0.19 Li/K ratio was sufficient to control the expansion in these test conditions, which is far lower than what is normally assumed to be a necessary amount of lithium to control the expansion, and is one of the teachings of this patent. For very highly reactive rhyolitic aggregates such as the one shown here, significantly higher Li/K ratios are necessary in the more concentrated potassium acetate environments, and these approach the upper limit of a 0.80 Li/K molar ratio.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed:

1. In a deicing composition that can cause ASR damage to concrete being deiced, the improvement comprising adding a lithium salt of a carboxylic acid or a lithium nitrate at a weight percent solids level such that the freezing point of the deicing composition is maintained and the deicing composition's eutectic point is not adversely affected.

2. The deicing composition of claim 1, wherein the weight percent solids of the deicing composition is 40 percent to 55 percent.

3. The deicing composition according to claim 1, wherein the carboxylic acid is selected from the group consisting of formic, acetic, propionic, glycolic, and lactic acids, and mixtures thereof.

4. A deicing composition according to claim 1 further comprising a corrosion inhibitor.

5. A deicing composition according to claim 4, wherein the corrosion inhibitor is a phosphate or a nitrate.

* * * * *